United States Patent [19]

Frame et al.

[11] Patent Number: 5,453,046
[45] Date of Patent: Sep. 26, 1995

[54] ROTATABLE LINKING AND HANGING DEVICE

[75] Inventors: Gordon Frame, Glasgow; Robin Brown, Airdrie, both of Scotland; Frederikus J. Brink, Veenendaal, Netherlands

[73] Assignee: Devro Limited, Glasgow, Scotland

[21] Appl. No.: 307,814

[22] PCT Filed: Apr. 2, 1993

[86] PCT No.: PCT/GB93/00701

§ 371 Date: Nov. 8, 1994

§ 102(e) Date: Nov. 8, 1994

[87] PCT Pub. No.: WO94/20702

PCT Pub. Date: Oct. 28, 1993

[30] Foreign Application Priority Data

Apr. 16, 1992 [GB] United Kingdom ............. 9208402

[51] Int. Cl.⁶ ........................................... A22C 15/00
[52] U.S. Cl. ........................... 452/186; 452/51; 211/113
[58] Field of Search ............................. 452/185, 186, 452/51; 211/113

[56] References Cited

U.S. PATENT DOCUMENTS

| | | |
|---|---|---|
| 1,459,067 | 6/1923 | Kruse ........................... 452/51 |
| 1,629,655 | 5/1927 | Curry. |
| 1,890,249 | 12/1932 | Edwards. |
| 1,936,354 | 11/1933 | Edwards. |
| 2,087,673 | 7/1937 | Lisberg. |
| 2,477,413 | 7/1949 | Mayer, Jr. .................. 452/186 |
| 2,592,939 | 4/1952 | Miller. |
| 2,643,777 | 6/1953 | Pickens, Sr. ............... 452/186 |
| 2,780,831 | 2/1957 | Harman. |
| 2,874,403 | 2/1959 | Lampard .................... 452/51 |
| 4,339,846 | 7/1982 | Zamzara .................... 452/51 |
| 5,306,204 | 4/1994 | Smith et al. ............... 452/51 |

FOREIGN PATENT DOCUMENTS

| | | |
|---|---|---|
| 1103444 | 11/1955 | France. |
| 1129045 | 1/1957 | France. |
| 342695 | 10/1921 | Germany ..................... 452/186 |
| 3933026 | 4/1990 | Germany ..................... 452/186 |

*Primary Examiner*—Willis Little
*Attorney, Agent, or Firm*—Bell, Seltzer, Park & Gibson

[57] ABSTRACT

Tubular casing with a food filling is linked and hung by a rotatable hanging stick having an array of notches or grooves (18) extending along the length of the stick at its perimeter. The grooves (18) are generally V-shaped but the trough has straight parallel sides and a curved bottom. The straight tubular casing is simultaneously gripped and formed or necked into a pigtail by the grooves (18) and links are formed between pigtails. The loaded stick is suitable for hanging in a smoke house.

6 Claims, 2 Drawing Sheets

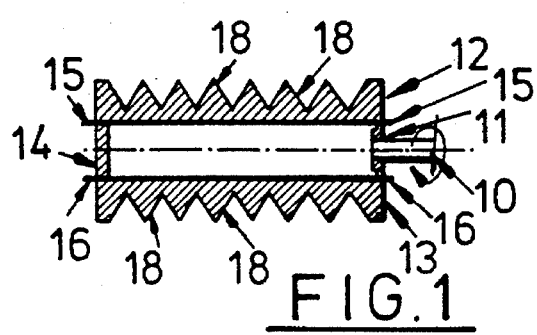
FIG.1
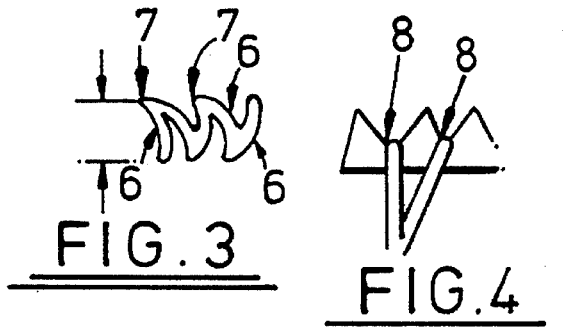
FIG.3
FIG.4
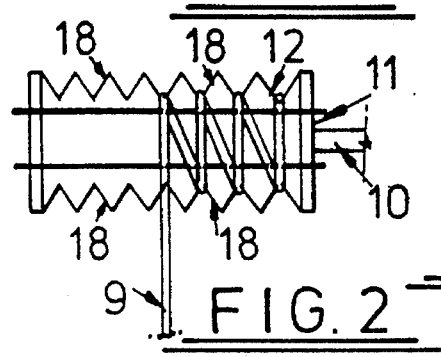
FIG.2
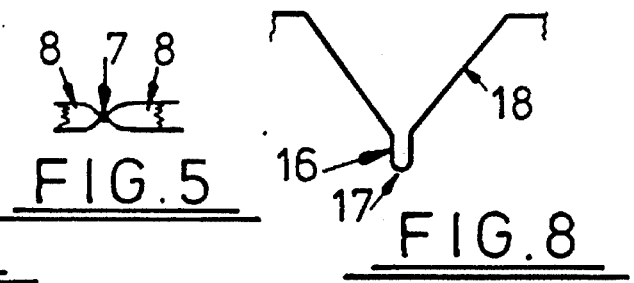
FIG.5
FIG.8
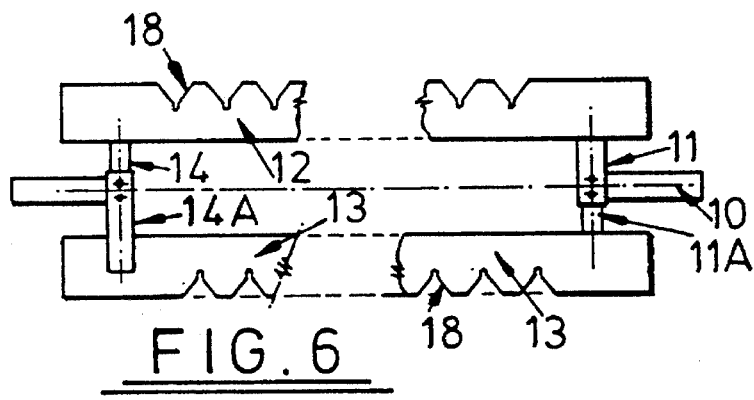
FIG.6
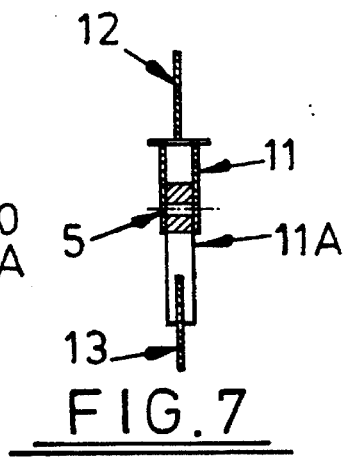
FIG.7
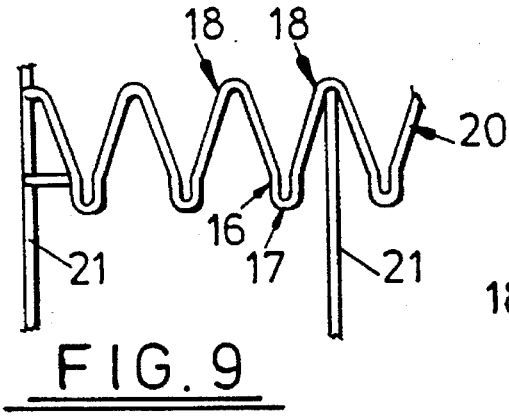
FIG.9
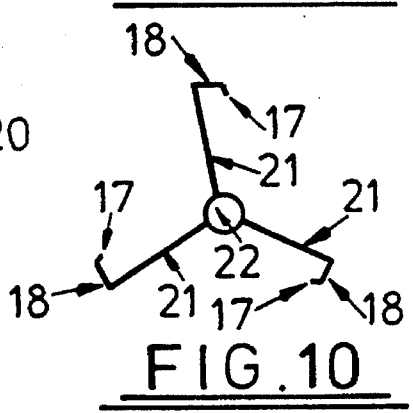
FIG.10

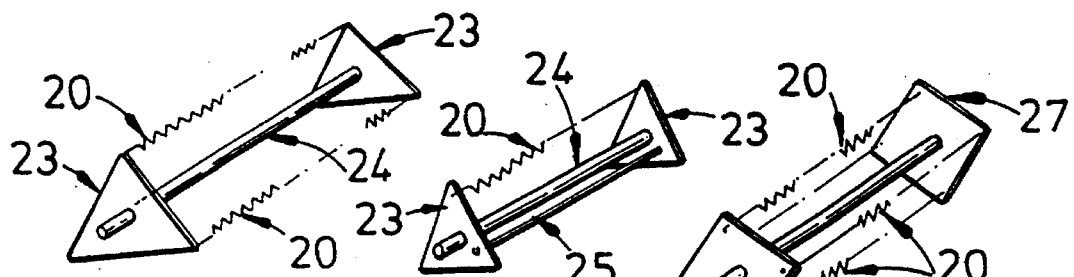
FIG.11　　FIG.12　　FIG.13
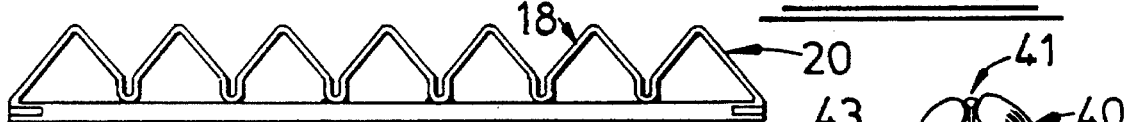
FIG.14
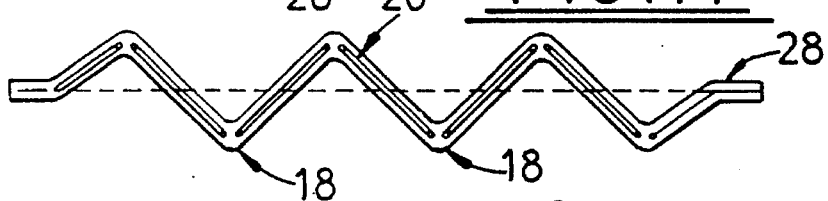
FIG.15
FIG.19
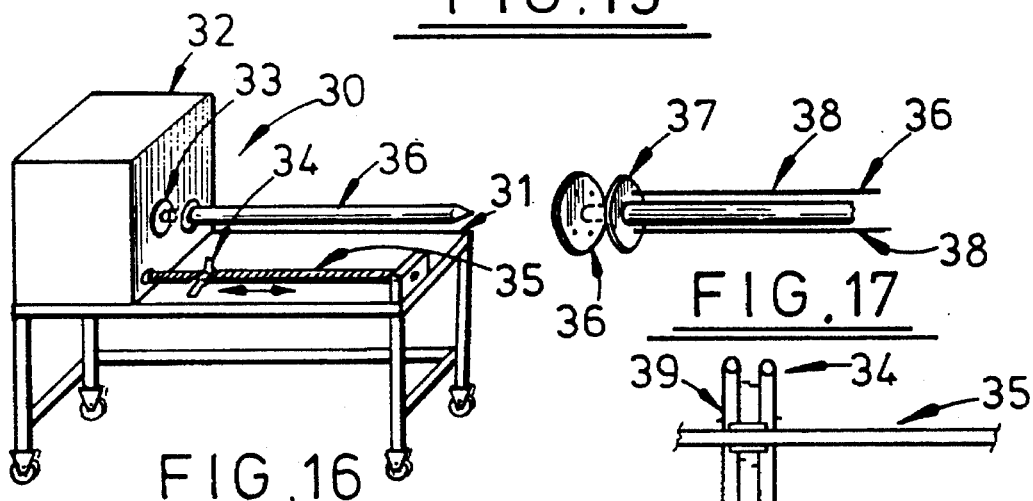
FIG.16　　FIG.17
FIG.18
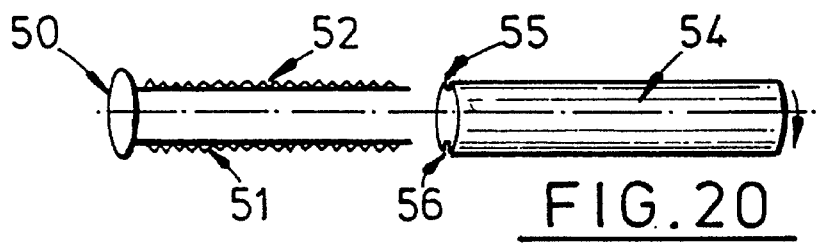
FIG.20

ROTATABLE LINKING AND HANGING DEVICE

This invention relates to a rotatable linking and hanging device for foodstuffs of the kind comprising a tubular casing with a food filling. The casing may, for example, be a collagen casing, a plastic casing, a casing of animal gut or any other generally tubular food casing. The food filling may, for example, be sausage-meat or hamburger meat or may be a non-meat filling such as a vegetarian filling or a cheese based filing or any other food filling. The casing may be prefilled with the food filling or formed by coextrusion with the food filling.

An object of the invention is to provide a new and improved device which hangs a length of tubular casing with a food filling and renders it suitable for cooking or smoking in an oven or smoke-house. Devices of this type are already known as hanging sticks and are used in a smoke oven to support an array of linked sausages, for example, in a smoke-filled atmosphere. A typical known form of hanging stick is a bar or rod of stainless steel of length about 1 meter and having a three-point-star cross-section.

According to the present invention there is provided a rotatable linking and hanging device in the form of a hanging stick comprising an array of notches or grooves extending along the length of the stick adjacent the perimeter of the stick, the arrangement being such that as the stick is rotated about its longitudinal axis an unlinked length or strand of tubular casing with a food filling is automatically wound around the stick and the grooves or notches acts to simultaneously grip the strand and form or neck the strand into links which extend between the notches or grooves.

Thus the device, according to the invention, simultaneously links and hangs a length of cased sausage meat or other foodstuff without imparting a twist to the strand and it differs from other linking and hanging devices in that the component which allows the linking and hanging to take place is the hanging stick itself. When the hanging stick loaded with its linked strand is subjected to the effects of a smoke house or smoke oven the encased food filling becomes formed or set in shape (which may be due to partial or complete cooking) and can thereafter be dismounted from the hanging stick without loss of its linked configuration.

Preferably the hanging stick has at least two spaced series of said grooves or notches extending on either side of the axis of rotation of the stick and adjustably arranged so that the spaced series of grooves may be moved closer together or further apart relative to said axis of rotation, whereby when they are moved closer together the formed links become curved.

By use of the adjustable feature, the device can be employed to manufacture curved sausage (for example) from a straight strand of sausage.

In one particular form the stick comprises a pair of elongate members formed with saw teeth to act as the notches or grooves and facing outwardly away from the longitudinal axis of rotation of the stick, the elongate members being jointed by cross members and capable of being attached to a shaft or handle which may be used to rotate the stick either by hand or by use of a motor. The saw tooth form is preferably an arrangement of V-slots, most preferably with each slot terminating at its trough in straight or parallel sides and a curved bottom.

In another particular form the stick comprises one or more lengths of profiled wire held at intervals along their lengths for example by radially extending outrigger members, each wire being of generally circular or oval cross-section and the profiling being such as to define the array of notches or grooves.

The notches or grooves need not extend radially but may extend part radially and part circumferentially. For example where each notch is generally a V-shape but terminating at its trough in straight or parallel sides interconnected by a curved bottom, that part of the notch which has mutually inclined sides may extend circumferentially whilst the trough portion may extend radially.

The notches or grooves preferably extend in a generally lineal fashion along the length of the stick but in an alternative configuration, to bring the troughs of the V-shapes axially closer together without alteration of the depth or angle of the V-shape, the notches or grooves may extend in a zig-zag fashion along the length of the stick. This alternative configuration is most conveniently implemented utilising profiled wire with the troughs of the V-shapes alternately laterally offset from the longitudinal axis of the stick. One convenient method of supporting the zig-zag profiled wire is by use of a rod which is similarly formed into a zig-zag shape.

In a still further form the stick may comprise two members on opposite sides of the rotational axis, one member incorporating the array of notches or grooves and the other member having a smooth surface which is free of notches or grooves. The other member, in use, simply functions as a spacer bar around which a comparatively long link is formed. The stick may incorporate more than one spacer bar. The or each spacer bar may be fixedly mounted on the stick or may be adjustably mounted. The smooth surface of the or each spacer bar may incorporate a helically extending half-round channel for seating each link and holding its tubular cross-sectional profile during the winding operation. In this case it is preferred that the spacer bar is adjustably mounted so that during the subsequent smoking operation the spacer bar is retracted from its initial position to free the links from the seated position thereby enabling smoking of the entire surface of the links.

In the case where the stick has two or more series of notches or grooves it is preferred that the troughs of the notches or grooves lie in a helix to facilitate automatic location of the filled casing into the troughs from a continuous or smooth axial movement of an automatic feeder.

In a particularly preferred arrangement the stick comprises an end plate to which is secured a set (which for example may be two) of elongate members formed with notches or grooves. The elongate members are small diameter rods and the notches or grooves are formed of profiled wire with the undersurface of the V-shaped troughs secured, for example by welding, to the rod member. The stick is rotated by being loaded onto a driven mandrel or spigot which is axially slotted on its periphery to provide seating for each of the elongate members in the set and the body of the mandrel or spigot provides a circumferentially extending bearing surface around which the links of the sausage or other cased food-stuff are formed. The bearing surface may be of fixed dimension or may be radially inwardly collapsible at least to a limited extent to ease axial withdrawal of the loaded stick from the mandrel or spigot.

The present invention also relates to a method of linking and hanging foodstuffs comprising a tubular casing with a food filling, the method including the steps of winding a strand of unlinked tubular casing with a food filling around a hanging stick having generally V-shaped notches or grooves along its length so as to cause the notches or grooves to simultaneously grip the strand and form or neck the strand into links which extend between the notches or grooves without imparting any twist to the strand.

Preferably the hanging stick to be loaded with food-stuffs is mounted on a winding machine and set into rotational motion thereby and product to be wound into the stick is separately delivered to the winding machine. The winding machine may also incorporate one or more elements which co-operate with the hanging stick when it is mounted on the winding machine, which elements function during product winding as bearing surfaces around which the product is wound.

Embodiments of the present invention will now be described by way of example with reference to the accompanying drawings, in which:

FIGS. 1 and 2 schematically illustrate a rotatable linking and hanging device in accordance with the present invention;

FIGS. 3, 4 and 5 illustrate the effect of the device shown in FIG. 1 and 2 in forming linked food products;

FIG. 6 illustrates a further embodiment of the device;

FIG. 7 is a cross-sectional view of part of the FIG. 6 device;

FIG. 8 illustrates a preferred form of a detail;

FIG. 9 illustrates part of an alternative embodiment of the device;

FIG. 10 illustrates a modification of the FIG. 9 embodiment;

FIGS. 11, 12 and 13 illustrate still further forms of the device;

FIGS. 14 and 15 illustrate an alternative construction of the device;

FIG. 16 illustrates a winding machine for use with the device;

FIGS. 17 and 18 illustrate details of the winding machine;

FIG. 19 illustrates formation of a ring sausage utilising a further form of the device; and FIG. 20 illustrates a particularly preferred form of the device and its method of co-operation with a winding machine.

In FIG. 1 the smoke stick comprises a handle 10 supporting an end piece 11 to which are attached two longitudinally extending saw toothed members 12 and 13. Members 12 and 13 are thin or plate like and joined at their far end by a second cross piece 14 and lugs 15 and 6 are provided to hang the stick onto a smoke trolley. Shaft 10 can be rotated manually or may have a motor (not shown attached).

FIG. 2 shows more clearly the V-shaped form of the saw teeth 18 and illustrates how a straight filled sausage 9 or other filled food-stuff may be wound onto the rotating stick. As the sausage winds onto the stick, links 8 are formed by the sausage casing being compressed into and held by the lower part of each saw tooth as illustrated in FIG. 4 and a 'pigtail' 7 is formed between the links as illustrated in FIG. 5. By moving together the two saw toothed parts of the stick after the links have been formed, as illustrated in FIG. 3, the sausages may be caused to bend to produce curved sausages 6. In the stick of FIGS. 1 and 2 the two sets of notches or grooves are arranged with the troughs of the V-shape diametrically opposed which requires discontinuous axial movement of the straight sausage 9.

As seen in FIG. 6, in a preferred construction the two saw toothed members 12 and 13 are actually supported by telescopic cross pieces 11, 11A and 14, 14A. The relative positions of the two saw toothed members may be adjusted by telescopic adjustment of the parts 11, 11A and 14, 14A which are provided with holes and a locating pin 5 to keep the parts in their adjusted positions. This arrangement can be seen in FIG. 7. Furthermore, the troughs of the V-shaped notches lie on a helix which enables continuous axial feeding movement of the straight sausage 9. It is for this reason that the notch 18 on member 12 nearest part 14 is longitudinally offset from the notch 18 on member 13 nearest part 14A.

In FIG. 8, the preferred form of a single saw tooth is shown. It consists of a 75 degree V-shaped notch 18 terminating at its trough in a straight sided slot 16 of about 3 mm width which has a curved bottom 17. Of course, the particular dimensions of the notch 18 may be varied to handle products of different dimensions and strengths.

Once the sausage has been linked by rotation of the device as the sausage is fed onto it, the loaded smoke stick is ready for inserting in a smoke house or oven.

FIG. 9 illustrates part of another form of smoke stick in which the saw toothed members 12, 13 of the previous arrangement are replaced by lengths of profiled wire 20. The wire is of circular or oval cross-section and is bent into a series of V-shaped notches or grooves 18 generally as shown in FIG. 8. There may be any number of such wires 20 jointed or held together for example by radially-extending outrigger members 21. The wire 20 of FIG. 9 generally lies in a single plane but an alternative as shown in FIG. 10 is for that portion of the notch 18 which has mutually inclined sides to extend circumferential! y from the outrigger members 21 whilst the trough portion containing straight sides 16 and curved bottom 17 extends generally radially. The members 21 are mounted on a central hub 22 which forms the axis of rotation of the smoke stick.

Various different geometries of smoke stick are illustrated schematically in Figures 11, 12 and 13 each incorporating one or more profiled wires 20. For example, in FIG. 11 there are three wires 20 (only two of which are visible) mounted on triangular end plates 23 with a central rod or hub 24. In FIG. 12 there is only one profiled wire 20, the other two being replaced by rods 25 which are free of notches or grooves and which function as spacer bars to permit curved links to be formed without any moving parts in the smoke stick. FIG. 13 illustrates a four wire smoke stick with square end plates 27.

In another alternative configuration illustrated in FIGS. 14 and 15 the troughs of the V-shapes 18 are brought axially closer together without alteration of the depth or angle of the V-shape by angling the V-shapes with respect to the longitudinal axis of the stick so as to provide a zig-zag layout of the profiled wire 20. The wire 20 is supported by a similarly zig-zag rod 28 which is bonded to the undersurface of the troughs of each of the V-shapes 18. This structure provides for increased density of loading the stick in that for any given length of stick more links 6 can be formed thereon.

All of the smoke sticks which have been described are preferably loaded with food-stuff utilising a motorised winding machine 30 as illustrated in FIG. 16. The machine 30 comprises a platform 31 above which is located a housing 32 containing a motor with gearbox and appropriate control gear. A rotatable socket 33 protrudes from the housing 32 for receiving handle 10 or rod 24, 25, and product to be wound is fed via a following guide 34 which moves along a parallel shaft 35 (also motor driven). Where the smoke stick has a hollow hub 22 or where there is no hub at all the machine 30 is modified by the provision of a spigot 36 which can be mounted to the socket 33. The smoke stick is then fitted to the spigot 36. Furthermore, spigot 36 may be modified as shown in FIG. 17 by the provision of a collar 37 carrying spacer bars 38. Three such bars 38 are illustrated but there could be any number. With this arrangement end plates 23, 27 require to be modified to provide apertures through which the bars 38 may pass and with this arrangement the product is formed into links which are prevented from sagging radially inwardly during the winding process. Alternatively, the spacer bars 38 may have such a mutual spacing as to pass on the outside of the end plates 23, 27 in which case links are formed which are of greater length then the spacing between the notched members 11, 12, 20.

As shown in FIG. 18, the following guide 34 may include a pre-portioning device 39 in the form of two counter-rotating butterfly chains to assist in formation of the pigtail or neck between links prior to the product reaching the V-slot. The machine 30 may also incorporate a product tensioning arrangement prior to the device 39 (if present) to ensure even formation of links.

Curved or even ring shaped links can be formed with the devices which have been described. FIG. 19 however illustrates a ring sausage 40 which is linked by a simple notched member 41 mounted on a hollow hub 42 which is received by the spigot 36 of the machine 30 and the spacer bars 38 are in the form of machine-mounted curved plates 43 which after winding are pivotal radially inwardly to be free from abutment with the ring sausage prior to the loaded smoke stick being withdrawn from the winding machine.

FIG. 20 illustrates a particularly preferred smoke stick which is formed by a disc like end plate 50 to which is secured two diametrically opposed elongate members 51, 52 formed with notches or grooves. The stick is rotated by being loaded onto a driven spigot 54 which is provided with diametrically opposed slots 55, 56 for receiving the members 51, 52 respectively. The spigot 54 is preferably cylindrical and the circumferential surface thereof between the slots 55, 56 function as a bearing surface or former around which the links of the sausage (etc.) are formed. The members 51, 52 are conveniently circular rods to which a linearly-extending profiled wire formed into V-slots is secured. It will be recognised that the end plate 50 may carry any suitable number of elongate members 51 in which case the spigot 54 has a corresponding number of slots on its periphery. In one form there is only a single elongate member 51 for the production of ring shaped sausages of the kind illustrated in FIG. 19.

We claim:

1. A winding machine for linking and hanging foodstuffs in the form of a length or strand of tubular casing with a food filling, said machine comprising a rotatable hanging stick having a longitudinal axis around which the strand is rotatable, the stick having an array of notches or grooves extending along its length with the array being adjacent the perimeter of the stick and offset from the longitudinal axis, each notch or groove in the array being generally V-shaped and terminating at its trough in a straight-sided slot which extends generally radially, the arrangement being such that as the stick is rotated about its longitudinal axis an unlinked strand is wound around the stick and the notches or grooves act to simultaneously grip the strand and form or neck the strand into links which extend in curves around the stick without a twist having been imparted to the strand, wherein the machine further comprises a following guide which, as the stick rotates, moves along a shaft parallel to but spaced from the axis of the stick, the following guide including a pre-portioning device whereby the unlinked strand is automatically delivered to the stick via the following guide and the pre-portioning device assists in the formation of a pigtail or neck between links prior to the strand reaching the notches or grooves.

2. A machine as claimed in claim 1, wherein the stick further comprises at least one smooth-surfaced spacer bar offset from the longitudinal axis and circumferentially spaced from the array of notches or grooves whereby the curved links are ring shaped.

3. A machine as claimed in claim 2, wherein the or each spacer bar is in the form of a curved plate.

4. A machine as claimed in claim 2 or claim 3, wherein the or each spacer bar is adjustably mounted on the stick so as to be movable between radially inner and outer positions, the latter being used when the stick is being loaded with a length or strand of filled tubular casing.

5. A method of linking and hanging foodstuffs in the form of a tubular casing with a food filling, the method including the steps of winding a strand of unlinked tubular casing with a food filling around a hanging stick having an array of generally V-shaped notches or grooves extending along its length the strand being delivered to the V-shaped notches or grooves without any twist to the strand, each notch or groove acting simultaneously to grip the strand and form or neck the strand into links which extend in curves around the stick, wherein prior to the strand reaching the notches or grooves the length or strand is passed through a pre-portioning device to assist in formation of a pigtail or neck between links.

6. A ring shaped food product when produced by the method of claim 5.

* * * * *